Nov. 26, 1929.  A. N. CRAMER  1,737,220
GLASS FEEDER
Filed Sept. 8, 1923   6 Sheets-Sheet 6
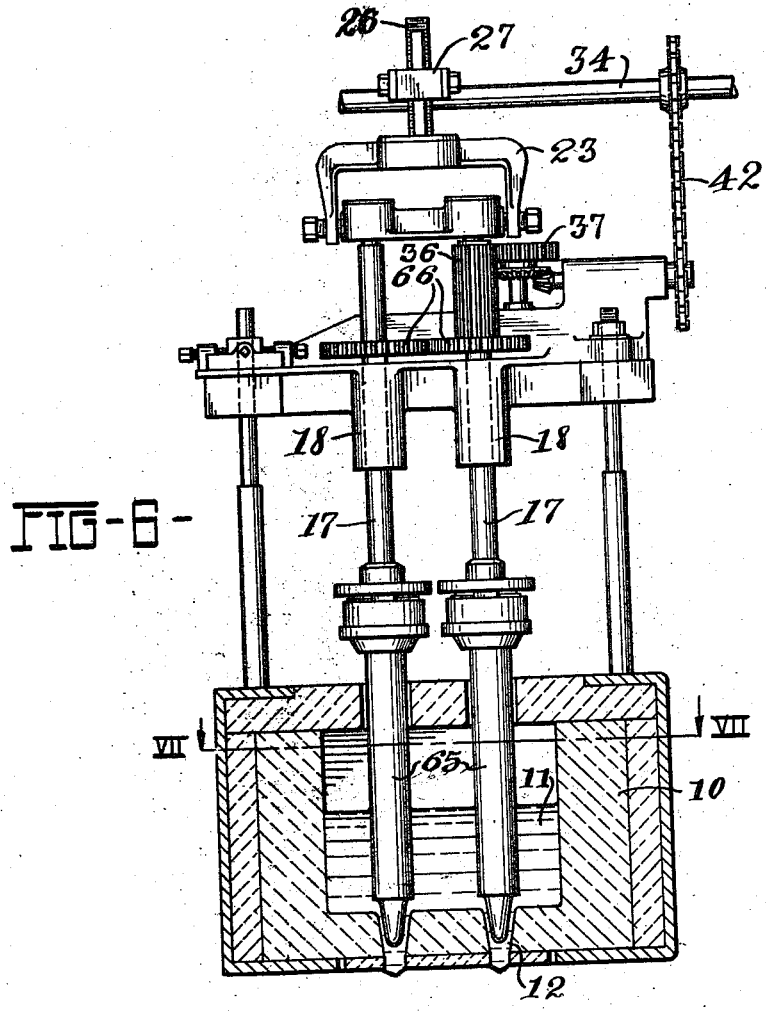
FIG-6-
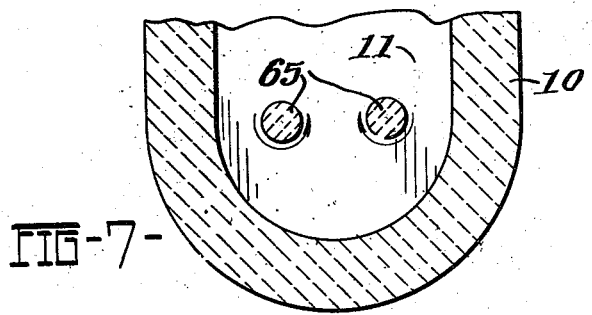
FIG-7-
INVENTOR
ALBERT N. CRAMER
By J. F. Rule
His Attorney Patented Nov. 26, 1929

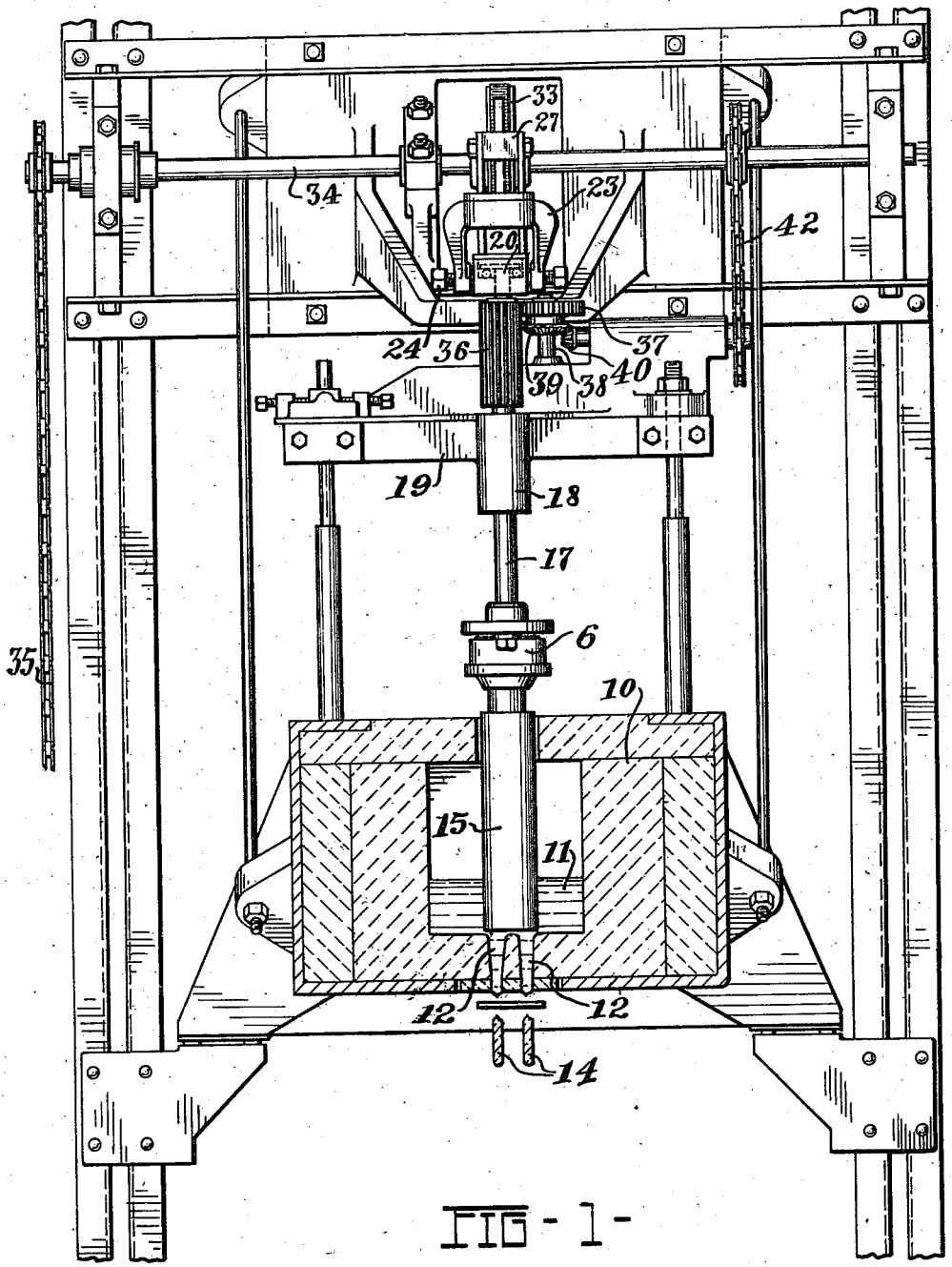

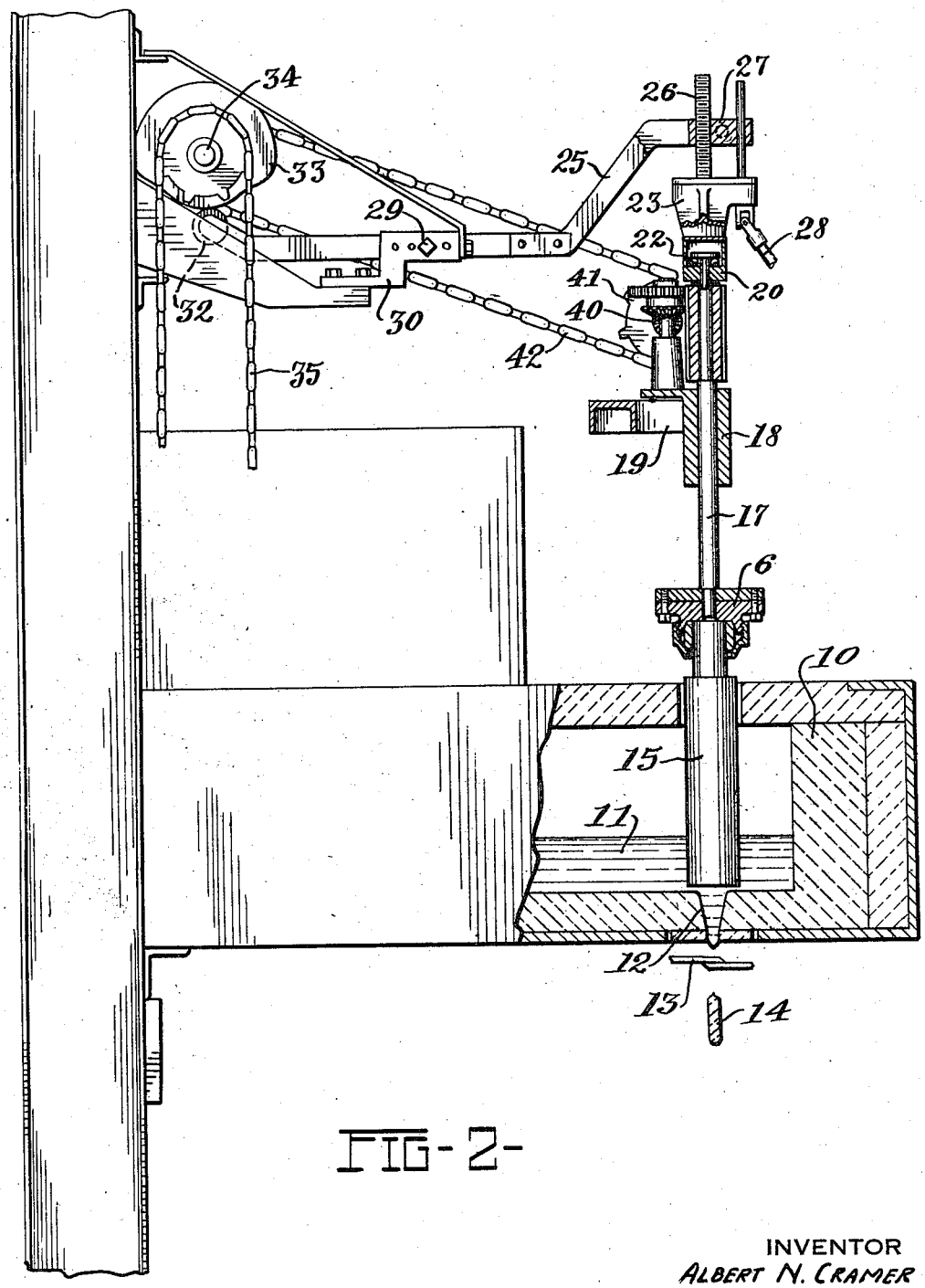
FIG-2-

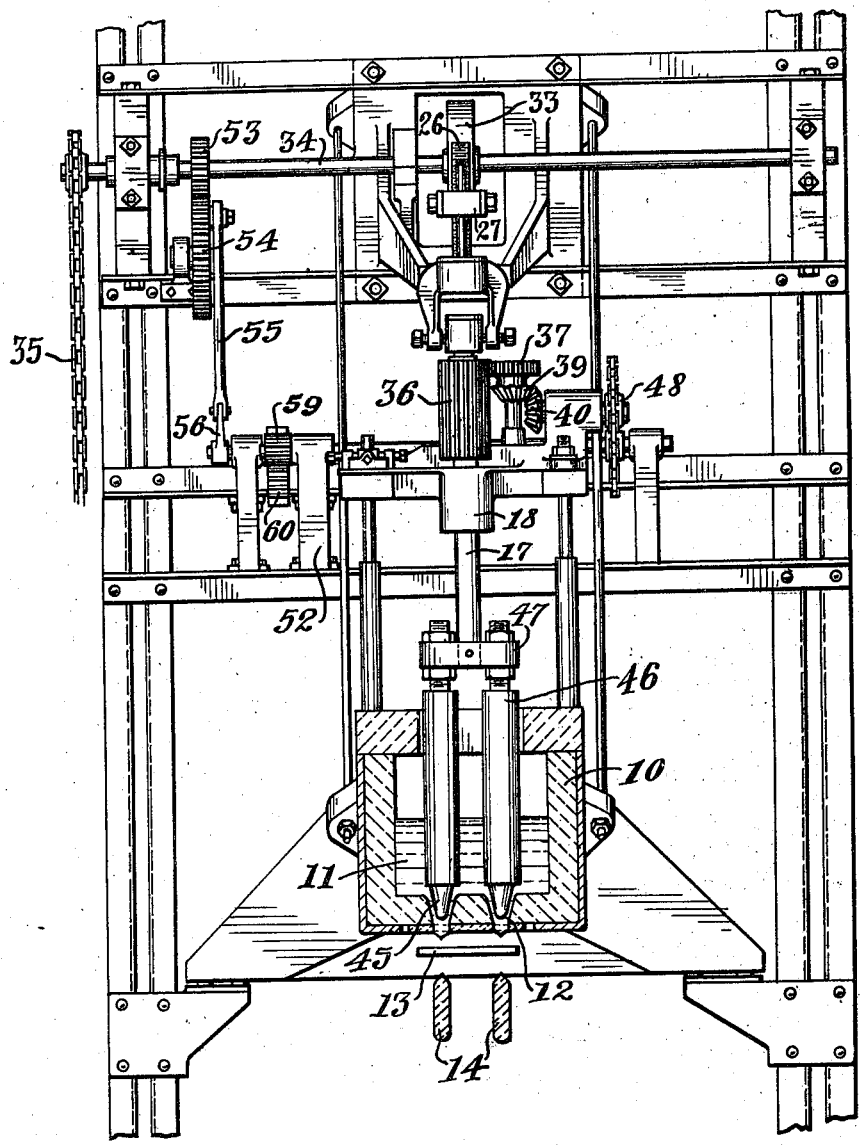
FIG-3-

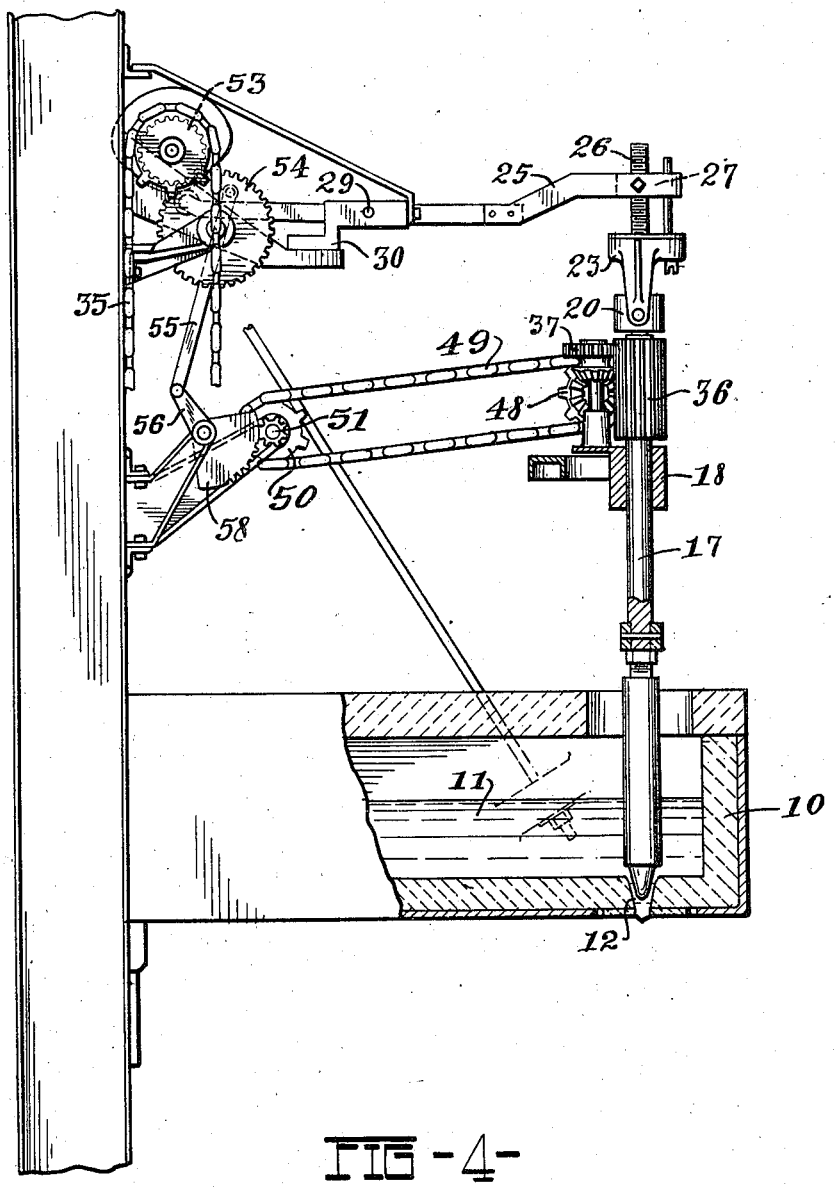

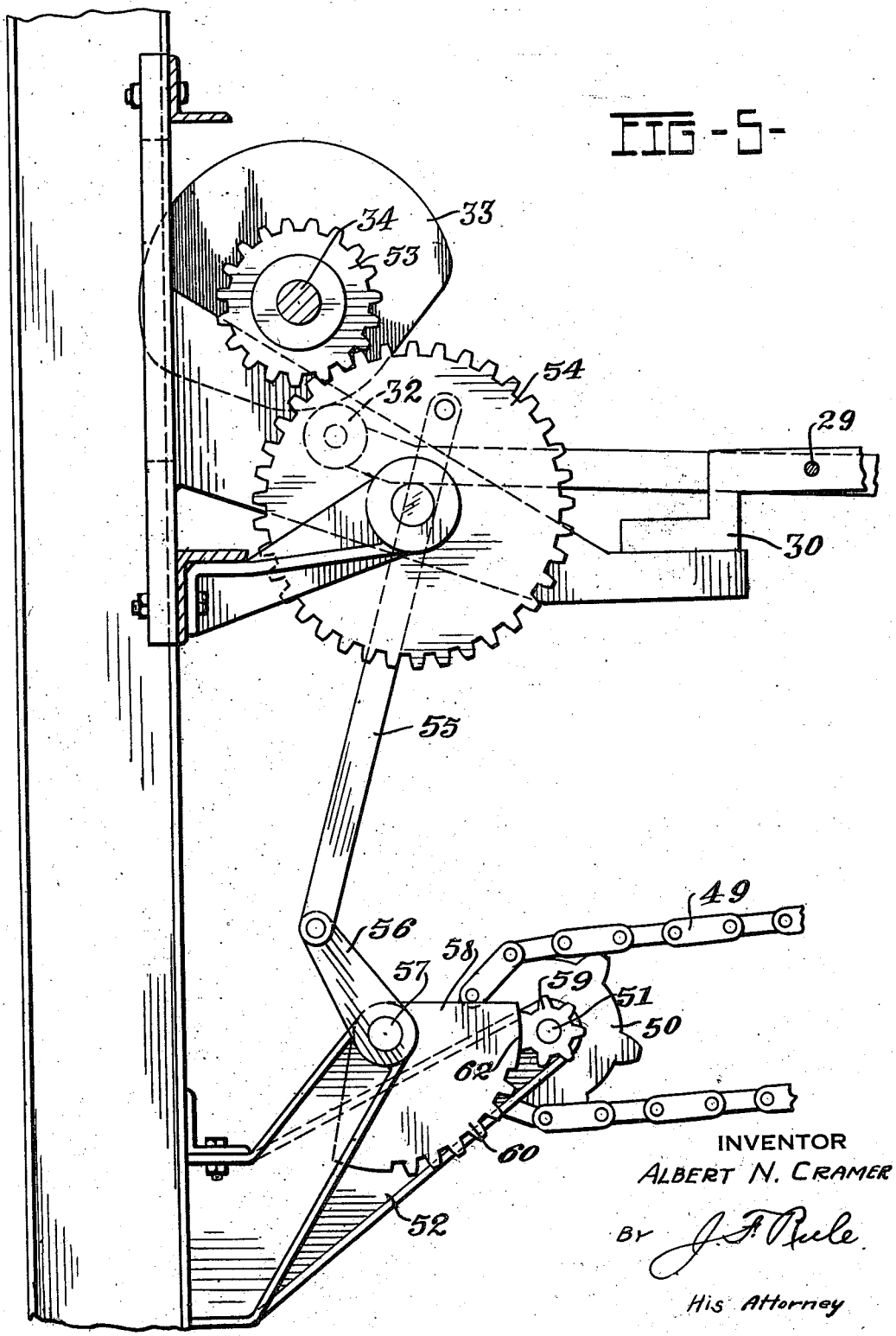

1,737,220

UNITED STATES PATENT OFFICE

ALBERT N. CRAMER, OF TOLEDO, OHIO, ASSIGNOR TO OWENS-ILLINOIS GLASS COMPANY, OF TOLEDO, OHIO, A CORPORATION OF OHIO

GLASS FEEDER

Application filed September 8, 1923. Serial No. 661,577.

My invention relates to glass feeders adapted for delivering individual masses or charges of glass from a receptacle containing a supply of molten glass. More particularly the invention relates to a feeder operative to simultaneously deliver a plurality of charges adapted for entering plural molds of a glass forming machine.

The invention is herein shown in connection with a glass feeder comprising a furnace boot or forehearth to which the glass is continuously supplied from the main furnace, said container having outlet openings in the bottom thereof through which the glass issues. Regulating means reciprocating vertically in the glass over the outlets, regulates and controls the discharge.

An object of the invention is to provide in a glass feeder of the character above indicated, suitable means for rotating the regulator and thereby maintaining a circulation or stirring of the glass in the container, such that stagnation or chilling of the glass in front of the regulator is prevented and uneven or one-sided chilling of the issuing gobs or charges is avoided.

The present invention involves various features of novelty, especially adapted for maintaining a proper circulation of the glass in a feeder designed to deliver a plurality of charges simultaneously.

Other objects of the invention will appear hereinafter.

In the accompanying drawings which illustrate several forms of construction embodying the principles of my invention:

Figure 1 is a part sectional front elevation of a glass feeder in which a single plunger or regulator controls the discharge through a plurality of outlets.

Figure 2 is a part sectional side elevation of the same.

Figure 3 is a part sectional front elevation of a modification in which separate plugs or regulating devices are provided for the individual outlets, means being provided for rotating said devices about a common axis.

Figure 4 is a part sectional side elevation of the mechanism shown in Figure 3.

Figure 5 is a detailed view on a larger scale of the mechanism for causing an intermittent rotation of the regulating means shown in Figures 3 and 4.

Figure 6 is a sectional elevation of a further modification in which the regulating plungers are rotated about their own axes.

Figure 7 is a section at the line VII—VII on Figure 6.

Referring particularly to Figures 1 and 2, the container 10, which may be the usual furnace boot or forehearth, is continuously supplied with molten glass 11 from the main furnace. The glass issues through outlet openings 12 in the floor of the boot, and the issuing glass suspended from the outlet orifices is periodically severed by knives 13. The severed charges or gobs 14 drop into the molds of a forming machine.

A vertical cylindrical plunger or regulator 15 projects downward into the glass over the outlets and is preferably large enough to cover both outlets. The plunger is removably mounted in a head 6 on the lower end of a shaft 17 which extends upward through a bearing sleeve 18 formed on a stationary bracket 19, the latter being secured to the framework which supports the furnace boot and feeder mechanism. The upper end of the shaft 17 has a bearing in a block 20, the weight of the shaft and plunger being supported by ball bearings 22. The block 20 is pivotally supported in a yoke 23 by means of pivots 24. Said yoke is connected to an operating lever 25, the connection comprising a screw rod 26 rotatable in the yoke 23 and threaded through a block 27 pivoted in the forked end of the lever 25. The height of the plunger may be adjusted by rotating the rod 26, by means of suitable gearing (not shown) manually operated by rotating a hand rod 28.

The operating lever 25 is fulcrumed at 29 on a stationary bracket 30. A cam roll 32 on the inner end of the lever, runs on a cam 33 fixed to a shaft 34 which is rotated continuously by a sprocket chain 35. The cam operates through the lever 25 to impart a periodic vertical reciprocation to the plunger 15, thereby controlling the discharge and shaping of the charges of glass.

The plunger is rotated about its own axis by mechanism comprising a pinion 36 fixed to the shaft 17 and driven by a gear 37 secured to a shaft 38. The shaft 38 is driven through a train of gearing comprising beveled gears 39 and 40, sprocket wheel 41 and sprocket chain 42, the latter driven by a sprocket on the cam shaft 34. Through the gearing just described a continuous rotation is imparted to the plunger 15. This causes an active circulation of the glass around the axis of said plunger, preventing stagnation of the glass in front of the plunger and causing a uniformity or homogeneity of the temperature of the glass issuing through the outlets. The gearing is preferably so proportioned that the plunger makes either a half rotation or one complete rotation for each vertical reciprocation, so that the plunger has a definite rotative position at the completion of its downward stroke. In this manner there is prevented any irregularity in the size or formation of the charges which might otherwise occur on account of irregularities in the plunger.

Figures 3, 4 and 5 illustrate a modification in which are provided a plurality of regulating plugs or plungers 46 individual to the outlets 12. The plunger tips 45 may project down into the outlets 12 when the plungers are lowered. The plungers are carried by a yoke 47 and are separately adjustable vertically therein. This permits the weight of the charges issuing from any outlet to be adjusted independently of the others.

The several plugs or plungers are preferably rotated about a common axis so that each plug is brought successively to operative positions over the several openings. For the purpose of illustration, two outlet openings are shown and the plugs are revolved through a half-revolution for each complete reciprocation, so that each plug cooperates alternately with the two openings. The means for rotating the head 47 carrying the plugs comprises the gears 36, 37, 39, 40, a sprocket wheel 48, sprocket chain 49 and sprocket wheel 50, the latter mounted on a shaft 51 (see Figure 5) journalled in a stationary bracket 52. Secured to the cam shaft 34 is a pinion 53, running in mesh with a gear wheel 54. A pitman 55 connects the gear 54 with a rock arm 56 on a rock shaft 57 to which is also connected a gear segment 58. The gear 54, as shown, is twice the diameter of the pinion 53 so that for each complete rotation of the cam shaft the gear 54 is rotated through 180 degrees. The rotation of the gear 54 rocks the gear segment 58 about its pivot. Each movement of the gear segment 58 operates through the gear teeth 60 thereon to rotate a pinion 59 fixed on the shaft 51. The pinion 59 and gear segment 58 have interlocking surfaces 62, whereby the pinion 59 is locked against rotation for predetermined periods during each oscillation of the gear segment. The arrangement is such that the head 47 and plugs 46 are held against rotative movement while in their lowered position. It will be noted that the rotation of the pinion 59 and, therefore, of the regulating plugs, is alternately in opposite directions, although the invention is not limited to such alternate movement. By alternating the direction of revolution, a more thorough mixing of the glass is obtained, and there is avoided any liability of the movement of glass developing into a current flowing through a channel of less active glass which is permitted to stagnate. The gearing is preferably proportioned to give either a complete rotation or a rotation through 180 degrees to the yoke 47 at each operation.

Figures 6 and 7 show a further modification in which the plugs or regulators 65 are rotatable about their own axes. In this arrangement, intermeshing gears 66 are secured to the plunger shafts 17 so that when one plunger is rotated the other is rotated in the opposite direction. The plungers may be rotated continuously by the cam shaft 34 operating through the gearing 36, 37 and 42 as described in connection with Figure 1.

Modifications may be resorted to within the spirit and scope of my invention.

What I claim is:

1. The combination of a container for molten glass provided with adjacent outlet openings through the floor thereof, regulating plungers projecting into the glass over said openings, means to reciprocate the plungers to periodically suspend formed charges from the walls of the openings, and means for causing horizontal rotation of the plungers, said rotating means being arranged to impart rotary movement to the plungers during the intervals between reciprocation of the latter.

2. In a glass forming apparatus, the combination of a container for molten glass provided with separate adjacent discharge outlets, mechanical regulating devices controlling the discharge, means for periodically reciprocating said devices vertically, and means causing horizontal rotation of said devices in synchronism with and in the intervals between the reciprocating movements.

3. A container for molten glass provided with discharge outlets, a regulating plunger, means to reciprocate said plunger vertically, and means to shift said plunger into register with said outlets successively.

4. A container for molten glass provided with discharge outlets, plungers projecting into the glass over said outlets, means to reciprocate said plungers, and means to move said plungers about a common axis and thereby bring each plunger successively into register with each of said outlets.

5. In glass feeding apparatus, the combination of a container for molten glass having outlet openings arranged side by side in the floor thereof, a lever, a cam to operate said lever, a yoke connected to the lever, regulating means supported by said yoke and projecting into the glass over said outlets, means to drive said cam and thereby reciprocate said regulating means vertically and mechanism for imparting intermittent rotative movement to the regulating means between the reciprocating movements of the latter for causing a circulation of the glass within the container.

6. The combination of a furnace boot or extension forming a container for molten glass and provided with adjacent outlet openings arranged side by side and extending through the floor of said boot, means for regulating and controlling the discharge of glass through said openings and forming mold charges suspended from the walls of said openings, including a plunger projecting downward into the glass, a stationary bracket supported on said boot over the outlets, a stem carried by said plunger and having a bearing in said bracket, a level fulcrumed intermediate its ends, a yoke at one end of said lever pivotally connected to said stem, a drive shaft, a cam thereon, a cam roll on the opposite end of said lever engaging said cam, an elongated gear pinion secured to said stem above said bracket to reciprocate with the plunger, a non-reciprocating driving gear mounted on said bracket and running in mesh with said pinion, and driving connections between said driving gear and the said drive shaft.

7. Apparatus for delivering charges of molten glass comprising a container for the glass having a bottom outlet, a plurality of implements, automatic means for bringing them periodically and in succession into operative position over the outlet, and means to operate each said implement when in said position to regulate the discharge of a charge of glass, said implements being thus operated in succession and the discharge of glass for successive mold charges controlled by different implements.

8. Apparatus for delivering charges of molten glass comprising a container for the glass having a bottom outlet, a plurality of implements, automatic means for bringing them periodically and in succession into operative position over the outlet, and means to reciprocate each implement vertically when in said position, said implements being thus operated in succession and the discharge of glass for successive mold charges controlled by different implements.

9. Apparatus for delivering charges of molten glass comprising a container for the glass having a bottom outlet, a plurality of implements, automatic means for bringing them periodically and in succession into operative position over the outlet, means to operate each said implement when in said position to regulate the discharge of a charge of glass, whereby the discharge of the glass to form successive charges is controlled by different implements and manual adjusting means by which the movement of each implement may be varied independently of the others, said implements being thus operated in succession and the discharge of glass for successive mold charges controlled by different implements.

10. Apparatus for delivering charges of molten glass comprising a container for the glass having a bottom outlet, a plurality of implements, automatic means for bringing them periodically and in succession into operative position over the outlet, means to reciprocate each implement vertically when in said position, whereby the discharge of the glass to form successive charges is controlled by different implements, and manual adjusting means by which the movement of each implement may be varied independently of the others.

11. Apparatus for delivering charges of molten glass comprising a container for the glass having a bottom outlet, a plurality of implements, automatic means for bringing them periodically and in succession into operative position over the outlet, and means to actuate each said implement when in said position to control the discharge of a charge of glass, whereby the discharge of the glass to form successive charges is controlled by different implements, said implements being so arranged that they will cause unequal volumes of glass to be discharged, whereby the volumes of the charges will vary periodically in a predetermined order.

12. Glass feeding apparatus comprising, in combination, a container for molten glass having a submerged outlet, plungers projecting into the glass, automatic means to bring said plungers periodically and in succession to a position over the outlet, and means to reciprocate each plunger up and down when in said position whereby different plungers are caused to control the discharge of glass to form successive mold charges.

13. Glass feeding apparatus comprising, in combination, a container for molten glass having a submerged outlet, plungers projecting into the glass, automatic means to bring said plungers periodically and in succession to a position over the outlet, means to reciprocate each plunger up and down when in said position, whereby different plungers are caused to control the discharge of glass to form successive mold charges, and adjusting means individual to the plungers for adjusting the plungers vertically.

14. Glass feeding apparatus comprising, in combination, a container for molten glass having a submerged outlet, plungers projecting into the glass, automatic means to bring said plungers periodically and in succession to a position over the outlet, means to reciprocate each plunger up and down when in said position, whereby different plungers are caused to control the discharge of glass to form successive mold charges, and adjusting means individual to the plungers for separately adjusting the upper and lower limits of movement respectively of each plunger.

15. Glass feeding apparatus comprising, in combination, a container for molten glass having a submerged outlet, plungers projecting into the glass, a carrier for the plungers, automatic means to rotate the carrier about a vertical axis and thereby bring the plungers periodically and in succession to operative position over the outlet, and means to reciprocate the plungers when in said position, whereby different plungers are caused to control the discharge of glass to form successive mold charges.

16. Glass feeding apparatus comprising, in combination, a container for molten glass having a submerged outlet, plungers projecting into the glass, a carrier for the plungers, automatic means to actuate the carrier and thereby bring the plungers periodically and in succession to operative position over the outlet, and means to actuate the plungers when in said operative position, whereby the discharge of the glass to form successive mold charges is controlled by different plungers.

17. Apparatus for delivering charges of molten glass comprising a container for the glass having a bottom outlet, a plurality of implements projecting downward into the glass, means for moving said implements laterally thru the glass and thereby stirring the glass and bringing the implements periodically and in succession into operative position over the outlet, and means to actuate each implement when in said position to control the discharge of a charge of glass.

18. Glass feeding apparatus comprising, in combination, a container for molten glass having a bottom outlet, plungers projecting downward into the glass, means for moving the plungers laterally thru the glass for stirring the glass and bringing the plungers periodically and in succession to a position over the outlet, and means to move each plunger up and down when in said position.

Signed at Toledo, in the county of Lucas and State of Ohio, this 4th day of September, 1923.

ALBERT N. CRAMER.